3,534,026
[2,3-e]-DIHYDROPYRANYL STEROIDS AROMATIC IN RING A
Pietro de Ruggieri, Carmelo Gandolfi, and Umberto Guzzi, Milan, Italy, assignors to Ormonoterapia Richter S.p.A., Milan, Italy, a corporation of Italy
No Drawing. Continuation-in-part of application Ser. No. 600,737, Dec. 12, 1966. This application Mar. 8, 1968, Ser. No. 711,489
Claims priority, application Italy, Dec. 23, 1965, 28,567/65
Int. Cl. C07c *173/00*
U.S. Cl. 260—239.57      13 Claims

ABSTRACT OF THE DISCLOSURE

Aromatic [2,3 - e] - dihydropyranyl steroids of the oestra-, 19-nor- pregna- and 19 - nor - cholestra-1,3,5(10)-triene series.

These compounds have anti-coagulant and hypocholesterolemic activities.

---

This application is a continuation-in-part of our co-pending application Ser. No. 600,737, filed Dec. 12, 1966 and now abandoned.

This invention relates to compounds of the formula

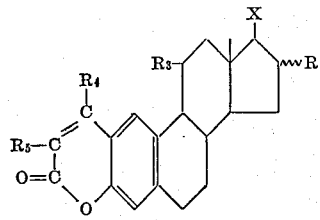

(I)

wherein:
R is a member selected from the group consisting of H, α-methyl, β-methyl, =CH$_2$, α-chloro-, α-bromo, β-chloro, β-bromo, α-hydroxy and β-hydroxy;
X is a member selected from the group consisting of

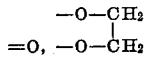

=O, —O—CH$_2$

17α,20:20,21-bismethylendioxy and the grouping

wherein R$_1$ is a member selected from the group consisting of H, hydroxy lower alkyl, —CH=CH—R$_6$,

2'-tetrahydropyranyloxy and acyloxy wherein the acyl radical is derived from a saturated or unsaturated aliphatic carboxylic acid of C$_2$–C$_{10}$, R$_6$ being a member selected from the group consisting of H and lower alkyl and R$_2$ is a member selected from the group consisting of OH, 2'-tetrahydropyranyloxy, acyloxy wherein the acyl radical is derived from an acid selected from the group consisting of an unsaturated or saturated aliphatic carboxylic acid of C$_2$–C$_{10}$, phenylacetic acid, phenylpropionic acid, phenylpropiolic acid, cinnamic acid, benzoic acid, salicylic acid and succinic acid,

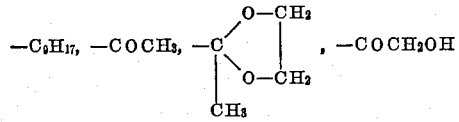

wherein the acyl radical is derived from an acid selected from the group consisting of a saturated or unsaturated aliphatic carboxylic acid of C$_2$–C$_{10}$, phenylacetic acid, phenylpropionic acid, phenylpropiolic acid, cinnamic acid, benzolic acid, salicylic acid, R$_1$ being hydroxy only when R$_2$ is —COCH$_2$OH— and succinic acid;

R$_3$ is a member selected from the group consisting of H, α-hydroxy, β-hydroxy and keto;

R$_4$ is a member selected from the group consisting of H, lower alkyl, —COOH, —COOCH$_3$ and —COOC$_2$H$_5$; and R$_5$ is a member selected from the group consisting of H, —COOH, —COOCH$_3$, —COOC$_2$H$_5$, —CO—N(R$_6$)$_2$, —CO—R$_7$, —CO(CH$_2$)$_n$—CH$_2$N(R$_6$)$_2$,

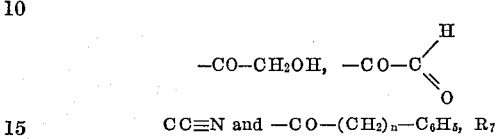

CC≡N and —CO—(CH$_2$)$_n$—C$_6$H$_5$, R$_7$ being lower alkyl and n being 0 or an integer from 1 to 5.

These compounds have anti-coagulant and hypocholesterolemic activities.

The compounds of the invention are prepared by starting with compounds of the formula

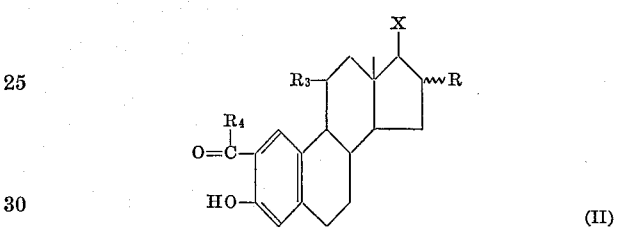

(II)

wherein X, R, R$_3$ and R$_4$ have the meanings given above.

The starting compounds are prepared in the manner described in our copending U.S. application Ser. No. 572,665 filed Aug. 16, 1966.

Compounds of Formula I are produced by reacting compounds of Formula II, in the presence of a member selected from the group consisting of piperidine, ε-aminocaproic acid and triethylamine, with a compound containing reactive methylene groups of the formula

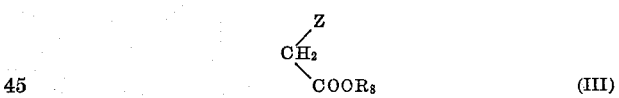

(III)

wherein R$_8$ is a member selected from the group consisting of H, methyl and ethyl and Z is a member selected from the group consisting of

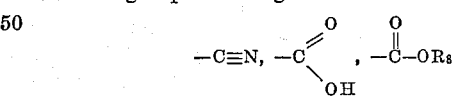

R$_6$, R$_8$ and n having the meanings given above.

Compounds of Formula I in which R$_5$ is hydrogen are prepared by mild acidic hydrolysis of a compound of the formula

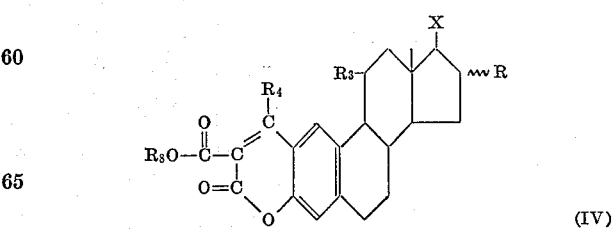

(IV)

wherein X, R, R$_3$, R$_4$ and R$_8$ have the meanings given above.

The following examples serve to better illustrate the invention but not to limit it in any way.

EXAMPLE 1

Oestra-1,3,5(10)-trien-17β-ol-[2,3-e]-dihydropyran-3'-carbethoxy-2'-one-17-acetate To a solution of 0.99 part of 2-formyl-oestra-1,3,5(10)-trien-3,17β-diol in 27 parts of absolute ethanol is added 0.6 part of diethyl malonate and the resulting mixture is refluxed for three hours together with 0.5 part of piperidine and 0.05 part of glacial acetic acid.

The mixture is concentrated, then diluted with water and filtered to obtain after crystallization from acetone, 0.52 part of oestra-1,3,5(10)-trien-17β-ol-[2,3-e]-dihydropyran-3'-carbethoxy-2'-one; M.P. 188°–190° C.; $[\alpha]_D = +83°$ (CHCl$_3$); $\lambda_{max}$ 307, 344 m$\mu$ ($\epsilon$=14,600 and 9,000).

0.3 part of this compound is dissolved in 1.2 parts of pyridine and 0.6 part of acetic anhydride are added thereto. It is kept for 12 hours at room temperature, then diluted with water and filtered. The crude product affords by crystallization from acetone, 0.28 part of oestra-1,3,5(10)-trien-17β-ol-[2,3-e]-dihydropyran-3'-carbethoxy-2'-one-17-acetate; M.P. 204.5–206° C.; $[\alpha]_D = +27°$ (CHCl$_3$); $\lambda_{max}$ 306, 345 m$\mu$ ($\epsilon$=16,000, 10,000).

Analogously, the following compounds are prepared:

17α - methyl - oestra-1,3,5(10)-trien-17β-ol-[2,3-e]-dihydropyran-3'-carbethoxy-2'-one 17α - vinyl - oestra-1,3,5(10)-trien-17β-ol-[2,3-e]-dihydropropyran-3'-carbethoxy-2'-one 17α - ethyl - oestra-1,3,5(10)-trien-17β-ol-[2,3-e]-dihydropyran-3'-carbethoxy-2'-one 19 - nor - cholesta - 1,3,5(10)-trien-[2,3-e]-dihydropyran-3'-carbethoxy-2'-one 19 - nor - pregna - 1,3,5(10)-trien-20,20-ethylenedioxyl-[2,3-e]-dihydropyran-3'-carbethoxy-2'-one 19 - nor - pregna - 1,3,5(10)-trien-17α-hydroxy-20,20-ethylenedioxy - [2,3-e] - dihydropyran-3'-carbethoxy-2'-one 19 - nor - pregna - 1,3,5(10)-trien-20-one-[2,3-e]-dihydropyran-3'-carbethoxy-2'-one 19 - nor - pregna - 1,3,5(10)-trien-17α-hydroxy-20-one-[2,3-e]-dihydropyran-3'-carbethoxy-2'-one.

EXAMPLE 2

19 - nor - pregna - 1,3,5(10)-trien-11β,17α,21-triol-20-one-[2,3-e]-dihydropyran-3'-carbethoxy-2'-one To a solution of 4.1 parts of 2-formyl-17,20,20,21-bis - methylenedioxy - 19-nor-pregna-1,3,5(10)-trien-3,-11β-diol in 150 parts of ethanol, 1 part of piperidine and 0.1 parts of glacial acetic acid are added; then the mixture is heated under reflux for 3 hours together with 1.76 parts of diethyl malonate. The solution is concentrated and the precipitated product is filtered. 3.56 parts of 19-nor - pregna-1,3,5(10)-trien-17α,20,20,21-bismethylenedioxy - 11β - hydroxy-[2,3-e]-dihydropyran-3'-carbethoxy-2'-one are obtained.

2.5 parts of this product are kept for 30 minutes on a water bath togeher with 50 parts of aqueous formic acid at 60°–65° C. The solution is evaporated to dryness, the residue is taken up with CH$_2$Cl$_2$, washed with dilute alkali and water, made anhydrous and adsorbed on a silica gel column. By elution with methylene chloride and isopropyl alcohol at increasing concentrations, 1.25 parts of 19-nor-pregna - 1,3,5(10)-trien-11β,17α,21-triol-20-one-[2,3-e]-dihydropyran-3'-carbethoxy-2'-one are obtained.

EXAMPLE 3

Oestra-1,3,5(10)-trien-17β-ol-[2,3-e]-dihydropyran-3'-acetyl-2'-one

To a solution of 0.6 part of 2-formyl-oestra-1,3,5(10)-trien-3,17β-diol in 10 parts of absolute ethanol, 0.27 part of acetoacetic ester and 2 parts of a 2% solution of piperidine in absolute alcohol are added. It is kept under reflux for 30 minutes, then allowed to stand overnight at room temperature. The precipitated product is filtered (0.52 part; M.P. 225°–232° C.) and, after crystallization from methanol, 0.41 part of oestra-1,3,5(10)-trien-17β-ol - [2,3-e]-dihydropyran-3'-acetyl-2'-one are obtained; M.P. 234°–235° C.; $\lambda_{max}$ 314 and 355 m$\mu$ ($\epsilon$ 13,900, 10,900).

Starting with the corresponding 2-formyl-3-hydroxyl-1,3,5(10)-trien derivatives, the following products have been analogously prepared:

19 - nor - cholesta-1,3,5(10)-trien-[2,3-e]-dihydropyran-3'-acetyl-2'-one

17α -methyl - oestra - 1,3,5(10)-trien-17β-ol-[2,3-e]-dihydropyran-3'-acetyl-2'-one 17α - vinyl - oestra - 1,3,5(10)-trien-17β-ol-[2,3-e]-dihydropyran-3'-acetyl-2'-one 17α - ethyl - oestra - 1,3,5(10)-trien-17β-ol-[2,3-e]-dihydropyran-3'-acetyl-2'-one 17α - ethinyl - oestra - 1,3,5(10)-trien-17β-ol-[2,3-e]-dihydropyran-3'-acetyl-2'-one 19-nor-pregna-1,3,5(10)-trien-17α-hydroxy-20-one [2,3-e]-dihydro-pyran-3'-acetyl-2'-one 19 - nor - pregna - 1,3,5(10)-trien-20-one-[2,3-e]-dihydropyran-3'-acetyl-2'-one 19 - nor-pregna - 1,3,5(10)trien-17α,21-diol-11,20-dione-[2,3-e]-dihydropyran-3'-acetyl-2'-one.

EXAMPLE 4

17α-methyl-oestra-1,3,5(10)-trien-17β-ol-[2,3-e]-dihydropyran-3'-cyan-2'-one

To a solution of 3.93 parts of 2-formyl-17α-methyl-oestra-1,3,5(10)-trien-3,17β-diol in 50 parts of ethanol are added 1.55 parts of ethyl cyanoacetate and the resulting mixture is refluxed for 1 hour together with 2.5 parts of a 2.5% solution of piperidine in ethanol. The solution is concentrated to half volume and cooled. After 12 hours at room temperature, the crystallized product is filtered and recrystallized from acetone to afford 3.2 parts of 17α-methyl-oestra-1,3,5(10)-trien-17β-ol-[2,3-e]-dihydropyran-3'-cyan-2'-one.

Analogously, the following are prepared:

oestra-1,3,5(10)-trien-17β-ol-[2,3-e]-dihydropyran-3'-cyan-2'-one oestra-1,3,5(10)-trien-17β-ol-[2,3-e]-dihydropyran-3'-cyan-2'-one-17-acetate 17α-vinyl-oestra-1,3,5(10)-trien-17β-ol-[2,3-e]-dihydropyran-3'-cyan-2'-one 19-nor-cholesta-1,3,5(10)-trien-[2,3-e]dihydropyran-3'-cyan-2'-one 19-nor-pregna-1,3,5(10)-trien-20-one-[2,3-e]dihydropyran-3'-cyan-2'-one 19-nor-pregna-1,3,5(10)-trien-20,20-ethylendioxy-[2,3-e]-dihydropyran-3'-cyan-2'-one.

EXAMPLE 5

17α-ethyl-oestra-1,3,5(10)-trien-17β-ol-[2,3-e]-dihydropyran-3'-carbomethoxy-2'-one To a solution of 0.33 part of 2-formyl-17α-ethyl-oestra-1,3,5(10)-trien-3,17β-diol in 5 parts of anhydrous methanol are added 0.15 part of dimethyl malonate and 1 drop of piperidine. Reflux is carried out for 15 minutes, then it is concentrated to half volume and is allowed to cool. 0.28 part of 17α-ethyl-oestra-1,3,5(10)-trien-17β-ol-[2,3-e] - dihydropyran-3'-carbomethoxy-2'-one crystallize and are separated by filtration.

EXAMPLE 6

Oestra-1,3,5(10)-trien-17β-ol-17-acetate-[2,3-e]-dihydropyran-2'-one-3'-carboxylic acid In a small Erlenmeyer flask, 0.69 part of 2-formyl-oestra-1,3,5(10)-trien-3,-17β-diol-17-acetate are intimately mixed with 0.50 part of malonic acid and 0.02 part of anhydrous piperidine. The flask is immersed in an oil bath at 130° C. and kept at this temperature for 45 minutes. After cooling it is taken up with methanol. The oestra-1,3,5(10)-trien-17β-ol-17-acetate-[2,3 - e]-dihydropyran-2'-one-3'-carboxylic acid (0.25 part) crystallizes and is filtered under vacuum.

EXAMPLE 7

Oestra-1,3,5(10)-trien-17β-ol-17-acetate-[2,3-e]-dihydropyran-2'-one

To a solution of 0.1 part of oestra-1,3,5(10)-trien-17β-ol-17-acetate-[2,3-e]-dihydropyran - 2' - one-3'-carboxylic acid in 50 parts of acetone is added 1 part of 8 N hydrochloric acid and the mixture is kept at 40° C. for 24 hours. It is concentrated to a small volume, taken up with methylene chloride and the organic phase is repeatedly washed with 2 N sodium hydroxide and then with water. After dehydration by anhydrous $Na_2SO_4$, it is evaporated to dryness and by crystallization from ethyl ether, 0.045 part of oestra-1,3,5(10)-trien-17β-ol-17-acetate-[2,3-e]-dihydropyran-2'-one are obtained.

EXAMPLE 8

19-nor-cholesta1,3,5(10)-trien-[2,3-e]-dihydropyran-2'-one-3'-carboxylic acid 0.45 part of 19-nor-cholesta-1,3,5(10)-trien-[2,3-e]-dihydropyran-3'-carbomethoxy-2'-one are refluxed for 2 hours together with 50 parts of 5% ethyl alcoholic KOH. The mixture is concentrated to ⅓ of its volume, then cooled and the clear solution is acidified with 5 N HCl to Congo red. The precipitate is filtered, washed with water and taken up with an excess of an aqueous saturated solution of $NaHCO_3$. The solution is filtered and the filtrate is acidified with 5 N hydrochloric acid.

The precipitate is filtered under vacuum, washed with water and dried, finally crystallized from ethyl acetate to afford 0.26 part of 19-nor-cholesta - 1,3,5(10) - trien-[2,3-e]-dihydropyran-2'-one-3'-carboxylic acid. In addition to the compounds of the above examples, the following are set forth as specific compounds which are within the scope of the invention:

19-nor-cholesta-1,3,5(10)-trien-[2,3 - e]-dihydropyran-2'-one.

19 - nor-pregna-1,3,5(10)-trien-17α,21-diol-11,20-dione-[2,3-e]-dihydropyran-3'-carbethoxy-2'-one.

19 - nor - pregna-1,3,5(10)-trien-17α,21 - diol - 20-one-[2,3-e]-dihydropyran-3'-carbethoxy-2'-one.

Oestra1,3,5(10)-trien-17β-ol-[2,3 - e]-dihydropyran-2'-one-3'-carboxylic acid.

Oestra-1,3,5(10)-trien-17β-ol-[2,3 - e]-dihydropyran-2'-one.

We claim:
1. A compound of the formula

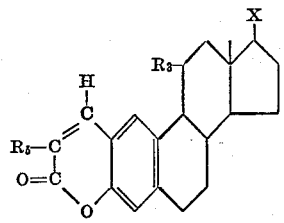

wherein: X is a member selected from the group consisting of 17α,20:20,21-bismethylendioxy and the grouping

wherein $R_1$ is a member selected from the group consisting of hydrogen, hydroxy, lower alkyl, —CH=CH₂ and —C≡CH, and $R_2$ is a member selected from the group consisting of hydroxy, acyloxy wherein the acyl radical is derived from a saturated aliphatic carboxylic acid of

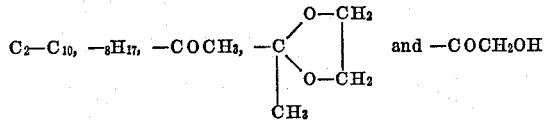

$R_1$ being hydroxy only when $R_2$ is —COCH₂OH; $R_3$ is a member selected from the group consisting of hydrogen, β-hydroxy and keto; and $R_5$ is a member selected from the group consisting of H, —COOH, —COOAlk, Alk being lower alkyl, —CO—$R_7$, $R_7$ being a member selected from the group consisting of hydrogen and lower alkyl, and —C≡N.

2. Oestra-1,3,5(10)-trien-17β-ol-[2,3 - e]-dihydropyran-3'-carbethoxy-2'-one.

3. 19-nor-cholesta-1,3,5(10)-trien - [2,3-e] - dihydropyran-3'-carbethoxy-2'-one.

4. 19-nor-pregna-1,3,5(10) - trien - 11β,17α,21-triol-20-one-[2,3-e]-dihydropyran-3'-carbethoxy-2'-one.

5. 19 - nor-pregna-1,3,5(10)-trien-17α-hydroxy-20-one-[2,3-e]-dihydropyran-2'-one-3'-carbethoxy.

6. Oestra-1,3,5(10)-trien-17β-ol - [2,3-e] - dihydropyran-3'-acetyl-2'-one.

7. Oestra-1,3,5(10)-trien-17β-ol - [2,3 - e] - dihydropyran-3'-cyan-2'-one.

8. 17α-methyl-oestra-1,3,5(10)-trien-17β-ol-[2,3 - e]-dihydropyran-3'-cyan-2'-one.

9. 17α-ethyl-oestra-1,3,5(10)-trien-17β-ol-[2,3 - e]-dihydropyran-3'-carbomethoxy-2'-one.

10. Oestra-1,3,5(10)-trien-17β-ol - 17 - acetate-[2,3-e]-dihydropyran-2'-one-3'-carboxylic acid.

11. Oestra-1,3,5(10)-trien-17β-ol - 17 - acetate-[2,3-e]-dihydropyran-2'-one.

12. 19-nor-cholesta-1,3,5(10)-trien - [2,3-e] - dihydropyran-2'-one-3'-carboxylic acid.

13. A method of preparing a compound of the formula

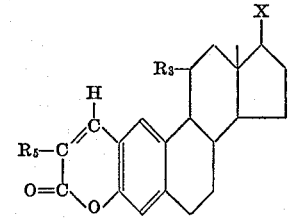

wherein: X is a member selected from the group consisting of 17α,20:20,21-bismethylendioxy and the grouping

wherein $R_1$ is a member selected from the group consisting of hydrogen, hydroxy, lower alkyl, —C=CH₂ and —C≡CH, and $R_2$ is a member selected from the group consisting of hydroxy, acyloxy wherein the acyl radical is derived from a saturated aliphatic carboxylic acid of

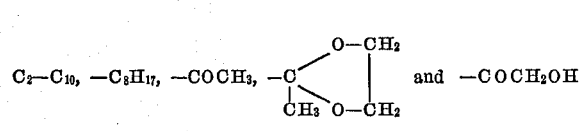

$R_1$ being hydroxy only when $R_2$ is —COCH₂OH; $R_3$ is a member selected from the group consisting of hydrogen, β-hydroxy and keto; and $R_5$ is a member selected from the group consisting of H, —COOH, —COOAlk, Alk being lower alkyl, —CO—$R_7$, $R_7$ being a member selected from the group consisting of hydrogen and lower alkyl, and —C≡N, said method comprising reacting in the presence of a member selected from the group consisting of piperidine, ε-aminocaproic acid and triethylamine, a compound of the formula

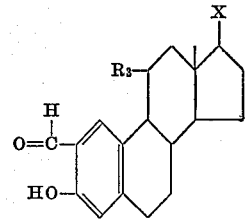

wherein X and $R_3$ have the meanings given above, with a compound containing a reactive methylene group of the formula

wherein $R_8$ is a member selected from the group consisting of H, methyl and ethyl and Z is a member selected from the group consisting of —C≡N, —COOH, —COOAlk in which Alk is lower alkyl, and —CO—$R_6$ in which $R_6$ is a member selected from the group consisting of hydrogen and lower alkyl and, when $R_5$ is H, subjecting to mild acid hydrolysis the product obtained when said compound containing a reactive methylene group has the formula

No references cited.

HENRY A. FRENCH, Primary Examiner

U.S. Cl. X.R.

260—999